United States Patent
Martelli

(10) Patent No.: US 6,699,320 B1
(45) Date of Patent: Mar. 2, 2004

(54) LOW PERMEABILITY BEVERAGE CONTAINER

(75) Inventor: Daniel M. Martelli, Bridgeport, CT (US)

(73) Assignee: PolyOne Corporation, Avon Lake, OH (US)

( * ) Notice: Subject to any disclaimer, the term of this patent is extended or adjusted under 35 U.S.C. 154(b) by 395 days.

(21) Appl. No.: 09/843,233

(22) Filed: Apr. 26, 2001

(51) Int. Cl.[7] .......................... C08K 13/02; C08K 5/01; C08K 3/36

(52) U.S. Cl. ..................................... 106/486; 106/487

(58) Field of Search ................... 106/486, 487, 106/272

(56) References Cited

U.S. PATENT DOCUMENTS

| | | | |
|---|---|---|---|
| 4,195,001 A | * | 3/1980 | Lytton .................... 523/177 |
| 4,209,568 A | * | 6/1980 | Clem ....................... 428/454 |
| 4,810,734 A | | 3/1989 | Kawasumi et al. |
| 5,102,948 A | | 4/1992 | Deguchi et al. |
| 5,780,376 A | | 7/1998 | Gonzales et al. |
| 5,871,846 A | * | 2/1999 | Freeman et al. ........... 428/405 |
| 5,876,812 A | | 3/1999 | Frisk et al. |
| 5,916,685 A | | 6/1999 | Frisk |
| 5,972,448 A | | 10/1999 | Frisk et al. |
| 6,034,163 A | | 3/2000 | Barbee et al. |
| 6,071,988 A | | 6/2000 | Barbee et al. |
| 6,187,719 B1 | * | 2/2001 | Dino et al. ................. 507/129 |

FOREIGN PATENT DOCUMENTS

| | | |
|---|---|---|
| WO | WO 99/03914 A1 | 1/1999 |
| WO | WO 99/32547 A1 | 7/1999 |

OTHER PUBLICATIONS

Brody, "Food Packaging" "4. Plastic Packaging", Kirk–Othmer Encyclopedia of Chemical Technology, 1994.*

* cited by examiner

Primary Examiner—David Brunsman
(74) Attorney, Agent, or Firm—John H. Hornickel

(57) ABSTRACT

A method includes steps for forming an intermediate composition. The intermediate composition is to be added to a polymer, or to a polymer precursor, in a process of manufacturing a low permeability container formed of the polymer or polymer precursor. The method includes forming an intermediate composition which, if added to the polymer or polymer precursor, will inhibit the permeability of the low permeability container subsequently formed of the polymer or polymer precursor. The forming step includes mixing a solid dispersant with clay to form the intermediate composition as a solid.

46 Claims, 3 Drawing Sheets

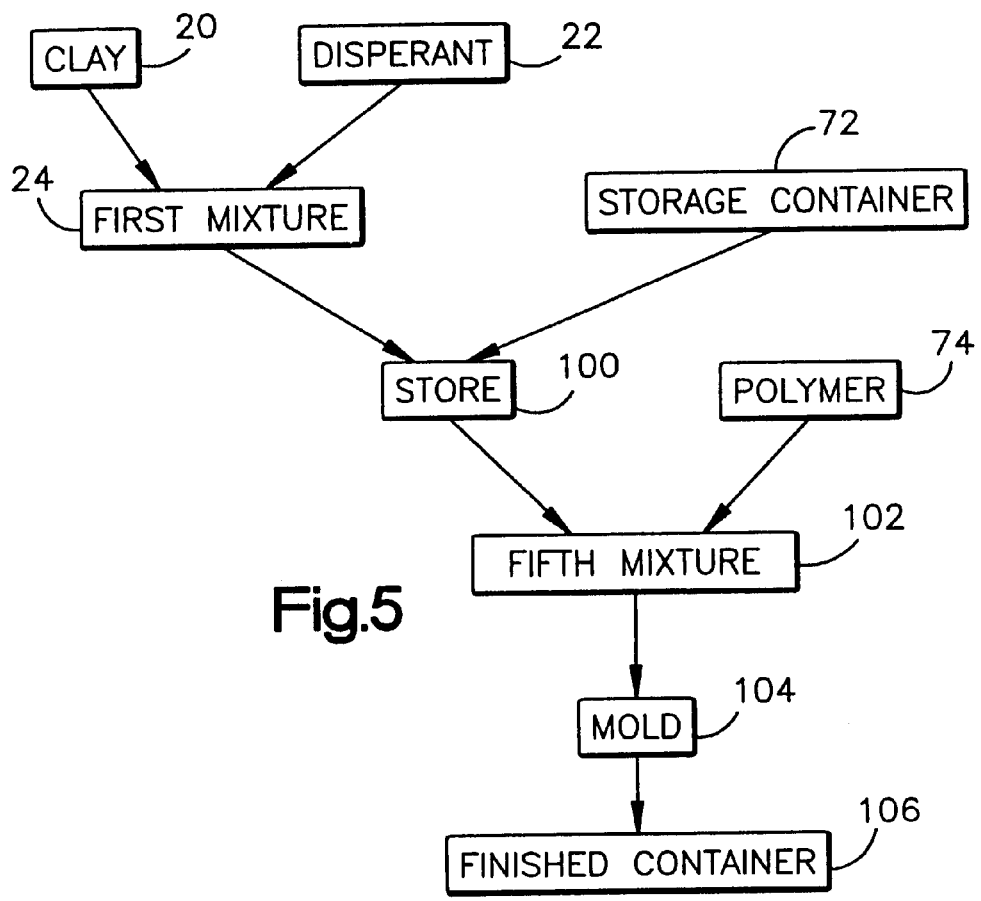

LOW PERMEABILITY BEVERAGE CONTAINER

FIELD OF THE INVENTION

The present invention relates to plastic containers for beverages.

BACKGROUND OF THE INVENTION

Food containers, including beverage bottles, can be molded from a plastic, such as polyethylene terephthalate (PET). Permeability of such bottles may be undesirable, since ingress of oxygen and egress of carbon dioxide can degrade food quality. Permeability can be reduced by blending the plastic with permeability-inhibiting additive before molding the plastic into the food container. For example, clay is sometimes used as such an additive.

SUMMARY OF THE INVENTION

The present invention comprises a method of forming an intermediate composition. The intermediate composition is to be added to a polymer, or to a polymer precursor, in a process of manufacturing a low permeability container formed of the polymer or polymer precursor. One manner of performing the method comprises forming an intermediate composition which, if added to the polymer or polymer precursor, will inhibit the permeability of the low permeability container subsequently formed of the polymer or polymer precursor. The forming step comprises mixing a solid dispersant with clay to form the intermediate composition as a solid.

In a preferred embodiment, the intermediate composition is free of the polymer or polymer precursor and is also free of water. It is advantageous for the clay to be exfoliated within the dispersant in the forming step. The clay is preferably a smectite, and is most preferably montmorillonite. The dispersant is preferably a wax, and is most preferably castor wax. The polymer is preferably a thermoplastic, and is most preferably a polyester, such as PET.

In another manner of performing the method, a permeability-inhibiting additive is mixed with a dispersant that is solid at room temperature to form a mixture which comprises the additive and the dispersant. The method further comprises dispersing the additive within the dispersant while maintaining the mixture at a temperature above the melting point of the dispersant. The method still further comprises cooling the mixture to a temperature below the melting point of the dispersant to form an intermediate composition which is solid and which, if added to the polymer or polymer precursor, will inhibit the permeability of the low permeability container subsequently formed of the polymer or polymer precursor.

BRIEF DESCRIPTION OF THE DRAWINGS

FIG. 5 is a flow diagram showing steps of yet another process according to the present invention.

DESCRIPTION OF THE INVENTION

Figure 1:
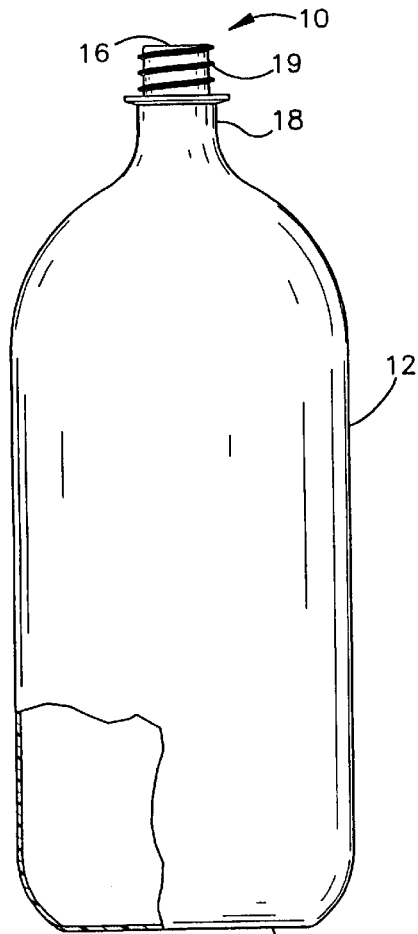
FIG. 1 is a perspective view of a container produced according to the present invention.

FIG. 1 shows a plastic container 10. In this embodiment, the container 10 is a beverage container, and is preferably used for holding pressurized carbonated beverages. The container 10 has a cylindrical side wall 12, a closed bottom wall 14, and an opening 16 at the top. Extending between the opening 16 and the side wall 12 is a tapered neck 18. The neck 18 has an external screw thread 19 for receiving a bottle cap (not shown).

In accordance with the present invention, the container 10 is formed of a plastic having low permeability to gases. This is especially desirable for carbonated beverages, in which egress of pressurized carbon dioxide and ingress of oxygen are undesirable. Migration of gas through the container walls 12, 14 and 18 is impeded by a dispersion of nanocomposite clay within the plastic. Microscopic platelets of the clay serve as barriers to gas molecules migrating through the plastic.

Figure 2:
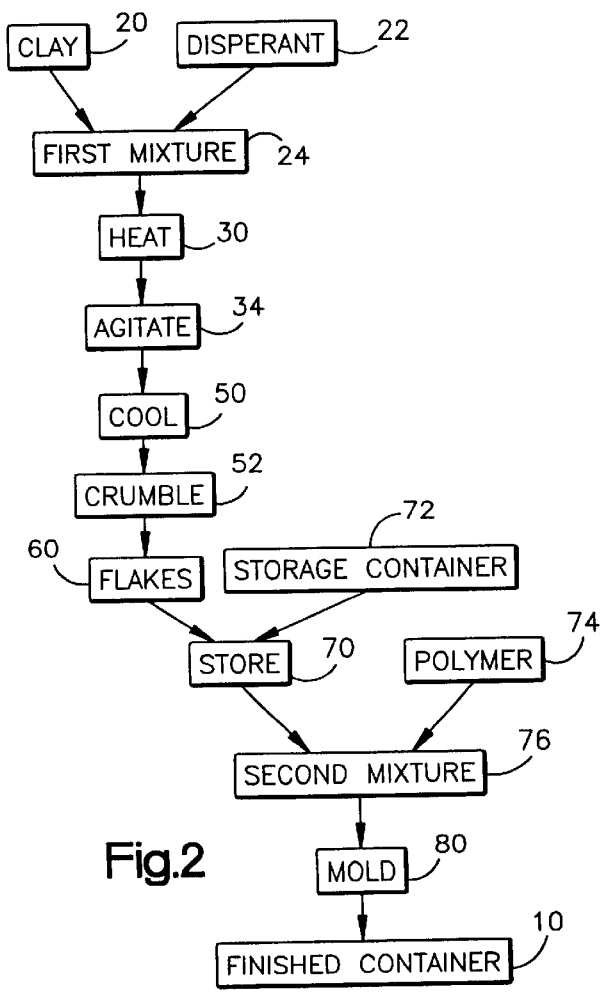
FIG. 2 is a flow diagram showing steps of a process according to the present invention.

The container 10 is manufactured through a process shown schematically in FIG. 2. The process utilizes clay 20. In the preferred embodiment, the clay 20 is montmorillonite, which is in the smectite family of nanocomposite clays. Before processing, the clay 20 comprises agglomerates of platelet layers. The process also utilizes a dispersant 22. In the preferred embodiment, the dispersant 22 is castor wax, which is a solid hydrogenation product of castor oil.

The clay 20 is mixed with the dispersant 22 at room temperature to form a first mixture 24. The first mixture 24 preferably does not include water or any structural polymer.

Figure 3:
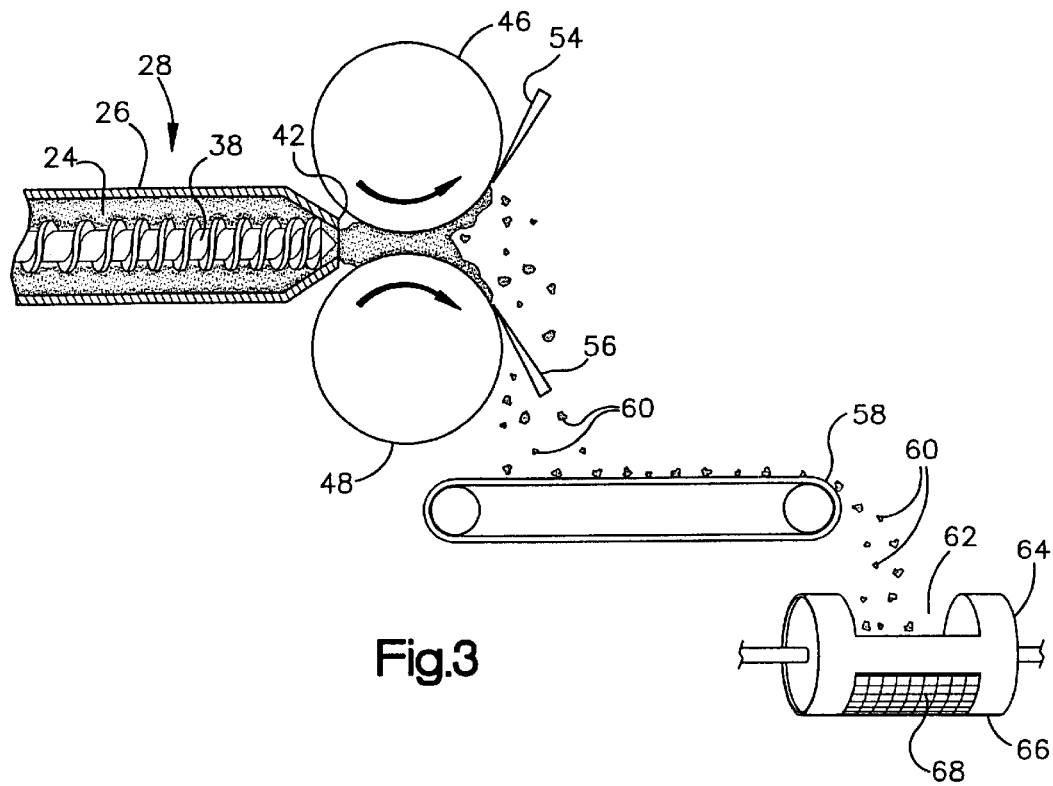
FIG. 3 is a schematic view of an apparatus used to perform steps of the process of FIG. 2.

Referring to FIG. 3, the first mixture 24 is heated in a barrel 26 of an extruder 28. In this heating step 30 (FIG. 2), the first mixture 24 is heated to a processing temperature above the melting point of the castor wax. The melting point is typically in the range of about 82° C. to about 104° C. In an agitating step 34 (FIG. 2), a deep flighted screw 38 within the barrel 26 agitates the heated first mixture 24. During the heating and agitating steps 30 and 34 (FIG. 2), the platelet layers are dispersed and preferably exfoliated within the melted castor wax 22. "Dispersed" means delaminated from neighboring layers and separated from neighboring layers by dispersant molecules interspersed between neighboring layers. Layers are "exfoliated" when the separation between layers is sufficiently large such that there is insufficient attraction between layers to cause uniform spacing between the layers.

The screw 38 moves the first mixture 24 to an extrusion die opening 42 (FIG. 3). The first mixture 24 is extruded out the die opening 42 in the form of a hot slurry. Next, two chilled chrome-plated rollers 46 and 48 are used to calender the first mixture 24 to a predetermined thickness. The thickness is determined by the spacing between the rollers 46 and 48. In a cooling step 50 (FIG. 2), contact with the chilled rollers 46 and 48 cools the first mixture 24 to a temperature below the melting point of the castor wax 22.

In a crumbling step 52 (FIG. 2), a portion of the first mixture 24 is scraped off of the rollers 46 and 48 by stationary scrapers 54 and 56. The first mixture 24 falls onto a conveyer belt 58 in the form of flakes 60. From the conveyer belt 58, the flakes 60 drop into an opening 62 of a rotatable drum 64. The drum 64 has a cylindrical wall 66 partially comprised of a filtering mesh 68. The drum opening 62 is closed, and then the drum 64 rotates. As the drum 64 rotates, the flakes 60 tumble within the drum 64 and break apart into flakes of smaller size. The flakes 60 ultimately reach a size enabling the flakes 60 to fall through the mesh 68 and into a hopper (not shown).

The flakes 60 may or may not be stored, depending upon the preference of the manufacturer and/or user. In the optional storing step 70, shown in FIG. 2, the flakes 60 are stored in a sealed storage container 72 such as a drum or the like. While in dry solid form within the storage container 72, the flakes 60 are easily shipped to a facility where beverage bottles are manufactured.

At the facility, beverage bottles, such as the container 10 (FIG. 1), are molded from pellets of a structural polymer 74 (FIG. 2). The structural polymer 74 in this embodiment is PET. This is a type of polyester which, in turn, is a type of thermoplastic.

As shown in FIG. 2, the optionally stored flakes 60 and the polymer 74 are mixed to form a second mixture 76. The second mixture 76 is preferably formed as a stream of the flakes 60 and a stream of the polymer 74 are combined at an inlet of a molding machine (not shown). In step 80, the second mixture 76 is molded into the container 10 (FIGS. 1 and 2) as a finished product, in a manner known in the art. The container 10 has a single-layer wall composed of the clay 20, the dispersant 22, and the polymer 74.

In producing the first mixture 24 (FIG. 1), the amount of the clay 20, relative to the amount of the dispersant 22, is specified based on the ultimate use of the flakes 60. Specifically, the, amount of clay 20 is specified such that the flakes 60, when added to the polymer 74, inhibit the permeability of the container 10 subsequently formed of the polymer 74. In this embodiment, about 30 parts of the clay 20 are mixed with about 70 parts of the dispersant 22.

Figure 4:
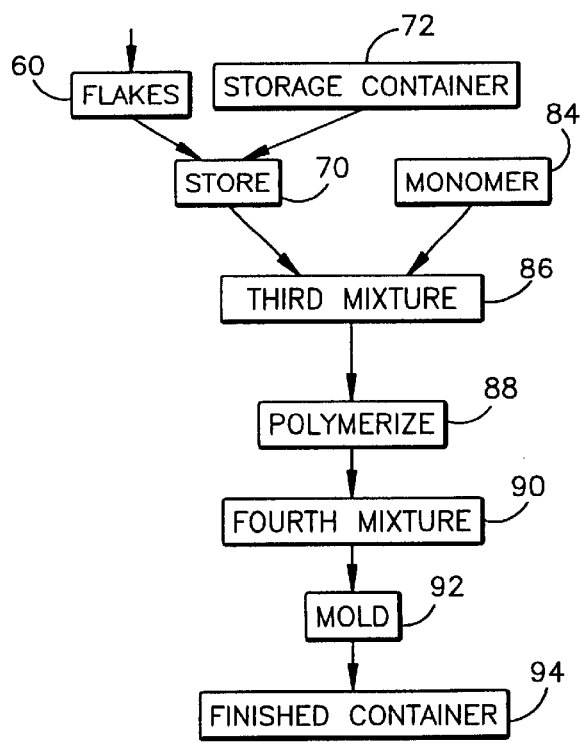
FIG. 4 is a flow diagram showing steps of another process according to the present invention.

As described above with reference to FIG. 2, the optionally stored flakes 60 are mixed with the polymer 74. Alternatively, as illustrated in FIG. 4, the flakes 60 may be mixed with a monomer 84, which is a precursor of PET polymer, to form a third mixture 86. The third mixture 86 is thus composed of the clay 20 (FIG. 2), the dispersant 22 (FIG. 2) and the monomer 84. In step 88, the monomer 84 is polymerized in situ within the third mixture 86 to form the PET polymer. This yields a fourth mixture 90 comprising the clay 20 (FIG. 2), the dispersant 22 (FIG. 2) and the PET polymer. In a manner similar to that described above, the fourth mixture 90 is molded, in step 92, into a container 94.

As described above with reference to FIG. 2, the polymer 74 is combined with the flakes 60. The flakes 60 are formed from the first mixture 24 through the steps of heating 30, agitating 34, cooling 50 and crumbling 52. Alternatively, as illustrated in FIG. 5, the steps of heating 30 (FIG. 2) and agitatinng 34 (FIG. 2) to disperse platelet layers of the clay 20 within the dispersant 22 are not performed. Therefore, the steps of cooling 50 (FIG. 2) the heated slurry and crumbling 52 (FIG. 2) the slurry after cooling are not required. In this process, in step 100, the first mixture 24 is stored in the storage container 72 and shipped to a facility where bottles are molded from the polymer 74. Again, storage in a storage container and shipment to a separate facility are optional and are based on the preference of the manufacturer and/or user. At the facility, the polymer 74 is combined with the first mixture 24 at the throat of the molding machine to form a fifth mixture 102. In step 104, the fifth mixture 102 is molded into a finished container 106.

Permeability of plastic bottles produced according to the present invention was measured. A process similar to that shown in FIG. 2 was used to produce the flakes. The flakes were composed of 70% montmorillonite clay and 30% castor wax. The castor wax was Maxsperse® obtained from M. A. Hanna Company of Cleveland, Ohio. The montmorillonite clay was Cloisite® 25A obtained from Southern Clay Products of Gonzales, Tex. A typical dry particle size distribution of Cloisite® 25A is 10% less than 2 microns, 50% less than 6 microns, and 90% less than 13 microns. Four bottles were produced using PET as the structural plastic. The amount of flakes added to the PET polymer was 0%, 0.5%, 1.0% and 1.5% for the four bottles, respectively. The bottles were tested on a Mocon OX-TRAN 10/50A oxygen permeability tester. In the test, the inside cavity of each bottle is flushed with nitrogen and the outside of each bottle is exposed to ambient air. Oxygen ingress is determined by measuring the oxygen concentration in the nitrogen flush gas exiting the bottle. The test conditions are listed in Table 1. The test results are listed in Table 2. Oxygen ingress is reported in cc/bottle/day. Table 2 clearly shows that oxygen ingress is lower for the bottles that include the clay/dispersant flake according to the present invention than for the bottle that does not.

TABLE 1

TEST CONDITIONS

| | INSIDE THE CONTAINER | OUTSIDE THE CONTAINER |
| --- | --- | --- |
| Purge gas | nitrogen with 1% hydrogen | ambient air |
| Temperature | 71° F. +/− 2° F. | 71° F. +/− 2° F. |
| Humidity | 65% | 50% |

TABLE 2

OXYGEN PERMEABILITY

| | Concentration of flake in PET | | | |
| --- | --- | --- | --- | --- |
| | 0% | .5% | 1.0% | 1.5% |
| Time (days) | cc/bottle/day | | | |
| 9 | .0474 | .0305 | .0297 | .0294 |
| 10 | .0470 | .0298 | .0286 | .0280 |
| 11 | .0468 | .0292 | .0285 | .0274 |
| 15 | .0450 | .0281 | .0275 | .0266 |
| 17 | .0443 | .0280 | .0278 | .0270 |

The invention has been described with reference to preferred embodiments. Those skilled in the art will perceive improvements, changes and modifications. Such improvements, changes and modifications are intended to be within the scope of the claims.

What is claimed is:

1. A method of forming an intermediate composition to be added to a polymer or polymer precursor in a process of manufacturing a low permeability container formed of the polymer or polymer precursor, said method comprising:

forming an intermediate composition which, if added to the polymer: or polymer precursor, will inhibit the permeability of the low permeability container subsequently formed of the polymer or polymer precursor, said forming step comprising mixing a solid wax dispersant with clay to form said intermediate composition as a solid.

2. The method of claim 1 wherein said intermediate composition is free of the polymer or polymer precursor.

3. The method of claim 1 wherein said intermediate composition is free of water.

4. The method of claim 1 wherein said clay is exfoliated within said dispersant in said forming step.

5. The method of claim 1 wherein said clay is a smectite.

6. The method of claim 5 wherein said clay is montmorillonite.

7. The method of claim 1 wherein said dispersant is castor wax.

8. The method of claim 1 wherein the polymer is a thermoplastic.

9. The method of claim 8 wherein the polymer is a polyester.

10. The method of claim 9 wherein the polymer is polyethylene terephthalate.

11. The method of claim 1 further comprising, after said forming step, mixing said intermediate composition with said polymer or polymer precursor in the process of manufacturing the low permeability container formed of the polymer or polymer precursor.

12. The method of claim 1 wherein the low permeability container is a beverage bottle.

13. A method of forming an intermediate composition to be added to a polymer or polymer precursor in a process of manufacturing a low permeability container formed of the polymer or polymer precursor, said method comprising:

mixing a permeability-inhibiting clay additive with a wax dispersant that is solid at room temperature to form a mixture which comprises said additive and said dispersant; and dispersing said additive within said dispersant while maintaining said mixture at a temperature above the melting point of said dispersant; and cooling said mixture to a temperature below the melting point of said dispersant to form an intermediate composition that is solid and which, if added to the polymer or polymer precursor, will inhibit the permeability of the low permeability container subsequently formed of the polymer or polymer precursor.

14. The method of claim 13 therein said mixture is free of the polymer or polymer precursor.

15. The method of claim 13 wherein said mixture is free of water.

16. The method of claim 13 wherein said cooling step is performed during calendering of said mixture between chilled rollers.

17. The method of claim 13 wherein said clay is exfoliated within said dispersant in said dispersing step.

18. The method of claim 13 wherein said clay is a smectite.

19. The method of claim 18 wherein said clay is montmorillonite.

20. The method of claim 13 wherein said dispersant is castor wax.

21. The method of claim 13 wherein the polymer is a thermoplastic.

22. The method of claim 21 wherein the polymser is a polyester.

23. The method of claim 22 wherein the polymer is polyethylene terephthalate.

24. The method of claim 13 further comprising agitating said mixture during said dispersing step.

25. The method of claim 13 wherein the low permeability container is a beverage bottle.

26. An intermediate composition to be added to a polymer or polymer precursor in a process of manufacturing a low permeability container formed of the polymer or polymer precursor, said intermediate composition comprising:

a solid composition which, if added to the polymer or polymer precursor, will inhibit the permeability of the low permeability container subsequently formed of the polymer or polymer precursor, said solid composition comprising a solid wax dispersant and clay mixed with said dispersant.

27. The intermediate composition of claim 26 wherein said solid composition is free of the polymer or polymer precursor.

28. The intermediate composition of claim 26 wherein said solid composition is free of water.

29. The intermediate composition of claim 26 wherein said clay is exfoliated within said dispersant.

30. The intermediate composition of claim 26 wherein said clay is a smectite.

31. The intermediate composition of claim 30 wherein said clay is montmorillonite.

32. The intermediate composition of claim 26 wherein said dispersant is castor wax.

33. The intermediate composition of claim 26 wherein the polymer is a thermoplastic.

34. The intermediate composition of claim 33 wherein the polymer is a polyester.

35. The intermediate composition of claim 34 wherein the polymer is polyethylene terephthalate.

36. The intermediate composition of claim 26 wherein the low permeability container is a beverage bottle.

37. An intermediate composition to be added to a polymer or polymer precursor in a process of manufacturing a low permeability container formed of the polymer or polymer precursor, said intermediate composition comprising:

a composition which, if added to the polymer or polymer precursor, will inhibit the permeability of the low permeability container subsequently formed of the polymer or polymer precursor, said composition comprising a wax dispersant and a permeability-inhibiting clay additive mixed within said wax dispersant.

38. The intermediate composition of claim 37 wherein said composition is free of the polymer or polymer precursor.

39. The intermediate composition of claim 37 wherein said composition is free of water.

40. The intermediate composition of claim 37 wherein said dispersant is castor wax.

41. The intermediate composition of claim 37 wherein said clay is exfoliated within said dispersant.

42. The intermediate composition of claim 37 wherein said clay is a smectite.

43. The intermediate composition of claim 42 wherein said clay is montmorillonite.

44. The intermediate composition of claim 37 wherein the polymer is a thermoplastic.

45. The intermediate composition of claim 44 wherein the polymer is a polyester.

46. The intermediate composition of claim 45 wherein tie polymer is polyethylene terephthalate.

* * * * *